United States Patent [19]
Miyauchi et al.

[11] Patent Number: 5,877,881
[45] Date of Patent: Mar. 2, 1999

[54] OPTICAL TRANSMISSION SYSTEM

[75] Inventors: Akira Miyauchi; Kazuo Yamane; Yumiko Kawasaki, all of Kawasaki; Satoru Okano, Sapporo, all of Japan

[73] Assignee: Fujitsu Ltd., Kawasaki, Japan

[21] Appl. No.: 752,516

[22] Filed: Nov. 20, 1996

[30] Foreign Application Priority Data

Apr. 19, 1996 [JP] Japan .................................. 8-098704

[51] Int. Cl.⁶ .................................................. H04B 10/00
[52] U.S. Cl. ........................ 359/161; 359/173; 359/188
[58] Field of Search ................................ 359/161, 173, 359/188, 195, 130; 385/122, 37

[56] References Cited

U.S. PATENT DOCUMENTS

| | | | |
|---|---|---|---|
| 5,074,631 | 12/1991 | Hamano et al. | 385/3 |
| 5,170,274 | 12/1992 | Kuwata et al. | 359/182 |
| 5,343,322 | 8/1994 | Dirio et al. | 359/161 |
| 5,355,240 | 10/1994 | Drigent et al. | 359/161 |
| 5,361,319 | 11/1994 | Antos et al. | 385/123 |
| 5,606,445 | 2/1997 | Kikuchi et al. | 359/161 |
| 5,612,808 | 3/1997 | Audovin et al. | 359/161 |

FOREIGN PATENT DOCUMENTS

| | | | |
|---|---|---|---|
| 0590633 | 4/1994 | European Pat. Off. | 359/161 |
| 802642 A2 | 10/1997 | European Pat. Off. | |
| 7-74699 | 3/1995 | Japan . | |
| 9-284218 | 10/1997 | Japan . | |

OTHER PUBLICATIONS

Jopson et al; "Dispersion Compensation for Optical Fiber Systems", IEEE Communications Magazine, Jun. 1995 pp. 96–102.

Ovellette et al; "All–Fiber Devices for Chromatic Dispersion Compensation Based on Chirped Distributed Resonant Coupling", Journal of Lightwave Technology, vol. 12, No. 10, Oct. 1994.

Govind P. Agrawal, *Nonlinear Fiber Optics*, Chapter 3, "Group–Velocity Dispersion", pp. 51–65 (1989).

*Primary Examiner*—Kinfe-Michael Negash
*Attorney, Agent, or Firm*—Staas & Halsey

[57] ABSTRACT

A chirping parameter $\alpha$ in a transmitter is set to a positive value with respect to an SMF that has a positive dispersion value with respect to signal light. A dispersion compensator is provided not only at the receiving end but also at the transmitting end. This achieves a reduction in the number of types of dispersion compensators that should be prepared in advance to optimize transmission characteristics despite the variety in the lengths of transmission fibers.

62 Claims, 6 Drawing Sheets

OPTICAL TRANSMISSION SYSTEM

BACKGROUND OF THE INVENTION

1. Field of the Invention

The present invention relates to an optical transmission system using optical fiber.

2. Description of the Related Art

In the field of optical transmission systems, the development of larger-capacity, longer-distance systems is under way. To increase the transmission capacity, methods of increasing the bit rate are being studied along with wavelength multiplexing techniques. On the other hand, longer transmission distances can be accomplished by introducing optical amplifiers. Optical amplifiers are being developed as post-amplifiers for increasing transmitter power, as preamplifiers for boosting receiver sensitivity by raising input power, or as in-line amplifiers for repeaters. With the introduction of optical amplifiers, the allowable level difference between fiber input and output has been increased, expanding the range of allowable fiber loss.

On the other hand, the use of optical amplifiers has introduced a new problem of nonlinear effects because of increased optical input levels to the fiber. One is self-phase modulation (SPM), due to the optical Kerr effect (refractive index varies depending on light intensity), which causes frequency (wavelength) shifts in the rising and falling portions of a signal light pulse. In that case, even if the wavelength range of signal light before transmission is narrow, the signal light spreads out in wavelength range during transmission, and at the same time, the received waveform changes greatly because of the effect of chromatic dispersion. In other words, the upper limit of transmission optical power is determined by considering such effects.

Further, the velocity of the light propagating through a fiber depends on the wavelength of the light (this is called the chromatic dispersion of the fiber). Accordingly, light pulses containing a range of wavelengths tend to spread out or contract in pulse width as they travel along a fiber. Therefore, in an optical transmission system, the received waveform after transmission through a fiber is distorted because of the chromatic dispersion and, depending on the degree of the distortion, transmission errors occur. Chromatic dispersion can thus limit the transmission distance.

Previously, transmission degradation by fiber chromatic dispersion has been avoided by selecting a light source having a narrow wavelength range. However, as the bit rate increases up to 10 Gb/s, the problem of the fiber nonlinear effects arises, causing a situation where the transmission degradation cannot be avoided by simply selecting a light source having a narrow wavelength range.

In view of this situation, it has been proposed to compensate for transmission characteristics by using transmitter prechirping as well as selecting a light source having a narrow wavelength range. Transmitter prechirping is a technique for causing chirping in light pulses in the transmitter. There are two types of chirping: blue chirping that causes the wavelength to shift to the longer wavelength side at the rising of an output pulse and to the shorter wavelength side at the falling thereof, and red chirping that causes the wavelength to shift to the shorter wavelength side at the rising of an output pulse and to the longer wavelength side at the falling thereof, and the type of chirping is selected depending on the fiber mainly used in the transmission channel. Japanese Unexamined Patent Publication No. 4-140712 describes how transmission characteristics can be improved by applying blue chirping (chirping parameter $\alpha$ is negative) when the fiber has positive chromatic dispersion with respect to the signal light, and red chirping (chirping parameter $\alpha$ is positive) when the fiber has negative chromatic dispersion. That is, when the blue chirping is combined with positive chromatic dispersion or the red chirping combined with negative chromatic dispersion, the falling portion of a light pulse travels through the fiber faster than the rising portion thereof, which has the effect of contracting the light pulse. In this case, since the fiber's dispersion value is proportional to its length, a dispersion compensator is inserted in series with the fiber to make the overall dispersion value of the transmission channel match the amount of prechirping in the transmitter.

The type of fiber currently most popular and widely installed is the single-mode fiber (SMF) which has zero dispersion wavelength in the 1.3 $\mu$m band. This is because, in the case of a fiber with a relatively simple structure consisting of a uniform clad and core, the longest wavelength where zero dispersion can be achieved is 1.3 $\mu$m, and at longer wavelengths, zero dispersion can be achieved only by using a dispersion-shifted fiber (DSF) which is expensive and complex in structure, and also because of this, the 1.3 $\mu$m band, where fiber attenuation is considered low, has traditionally been used as the band for signal light wavelength. However, to extend transmission distance with the introduction of optical amplifiers, it becomes necessary to use signal light in the 1.5 $\mu$m band where erbium-doped fibers as optical amplifiers have gain regions and where fiber attenuation is considerably lower. If signal light at 1.5 $\mu$m is transmitted through an SMF whose zero dispersion is in the 1.3 $\mu$m band, dispersion is positive. In the prior art, therefore, it has been attempted to apply blue chirping (chirping parameter $\alpha$ is negative) to signal light in the transmitter, to try to improve the transmission characteristics by the combination with the positive dispersion of the fiber.

However, as will be described in detail later, in a computer simulation carried out considering the SPM, it has been found that if the chirping parameter $\alpha$ is negative, there arises the problem that many types of dispersion compensators that are expensive have to be prepared in advance for a variety of the fiber lengths since the range of the dispersion compensation amount that satisfies the desired transmission characteristic is narrow.

SUMMARY OF THE INVENTION

It is, accordingly, an object of the present invention to propose an optical transmission system that needs fewer types of dispersion compensators that have to be prepared in advance for the variety of the fiber lengths to satisfy the desired transmission characteristic.

According to the present invention, there is provided an optical transmission system comprising: an optical fiber installed between a transmitting end and a receiving end, and having a positive dispersion value with respect to the wavelength of an optical signal to be transmitted from the transmitting end to the receiving end; a dispersion compensator connected in series to the optical fiber at the transmitting end and/or at the receiving end, and having a negative dispersion value with respect to the wavelength of the optical signal to be transmitted; and chirping means for applying positive chirping to the optical signal at the transmitting end.

As will be described in detail later, according to the computer simulation conducted considering the SPM, when the parameter $\alpha$ of transmitter prechirping is positive, the range of the dispersion compensation amount that satisfies the desired transmission characteristic becomes wider than when the chirping is negative; as a result, a wider range of fiber length can be covered with fewer kinds of dispersion compensators. Since the phase modulation due to the SPM corresponds to chirping with a negative chirping parameter α, it is believed that if the transmitter chirping parameter α is positive, the effect of the SPM is alleviated and the transmission characteristic improves as a whole.

In general, the parameter α that represents the degree of transmitter prechirping changes through the rising or falling edge areas of a waveform. In this specification, values at a point 50% of the distance from the initial to the final level in the rising or falling transition of an optical output waveform are used and defined as typical values.

DESCRIPTION OF THE PREFERRED EMBODIMENTS

Figure 1:
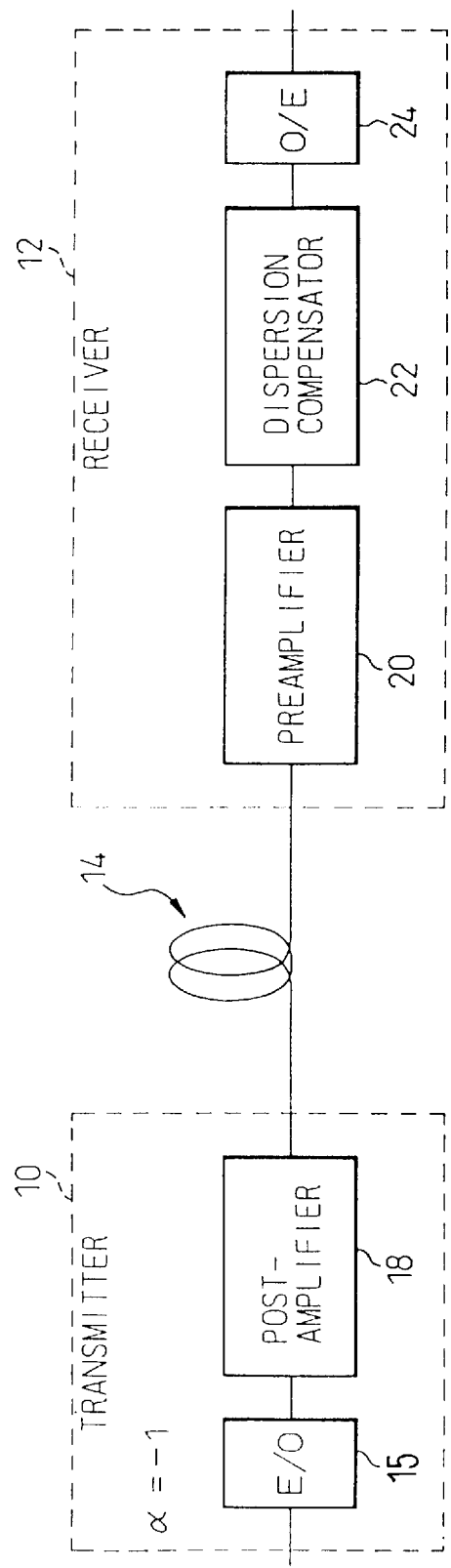
FIG. 1 is a block diagram of an optical transmission system according to the prior art.

Before proceeding to the description of the present invention, we will first describe a prior art optical transmission system in which the chirping parameter α is set negative when the fiber dispersion value is positive. In FIG. 1, a single-mode fiber (SMF) 14, whose zero dispersion wavelength is in the 1.3 μm band, is installed between a transmitter 10 and a receiver 12. The transmitter 10 includes an optical modulator 15 for converting an electrical signal into an optical signal, and a post-amplifier 18 for amplifying the output of the optical modulator 15 directly in optical form for transmission into the SMF 14. The chirping parameter α in the optical modulator 15 of the transmitter 10 is negative, for example, −1. The chirping parameter α is defined by the following equation.

$$\alpha = 2 \cdot (d\phi/dt)/((dS/dt)/S)$$

where φ is the light phase and S is the light intensity. The receiver 12 includes a preamplifier 20 for amplifying the optical signal output from the SMF 14 directly in optical form, a dispersion compensator 22 for compensating for the overall dispersion value of the transmission channel so that the value counterbalances α=−1, and an optical detector 24 for converting the optical signal into an electrical signal. The wavelength of the optical signal is in the 1.5 μm band which falls within the gain region of the optical amplifiers 18 and 20. Therefore, the dispersion value of the SMF 14 is positive. The dispersion compensator 22 is chosen to have an appropriate dispersion value that keeps the overall dispersion value constant despite the variety in the lengths of the SMF 14.

Figure 2:
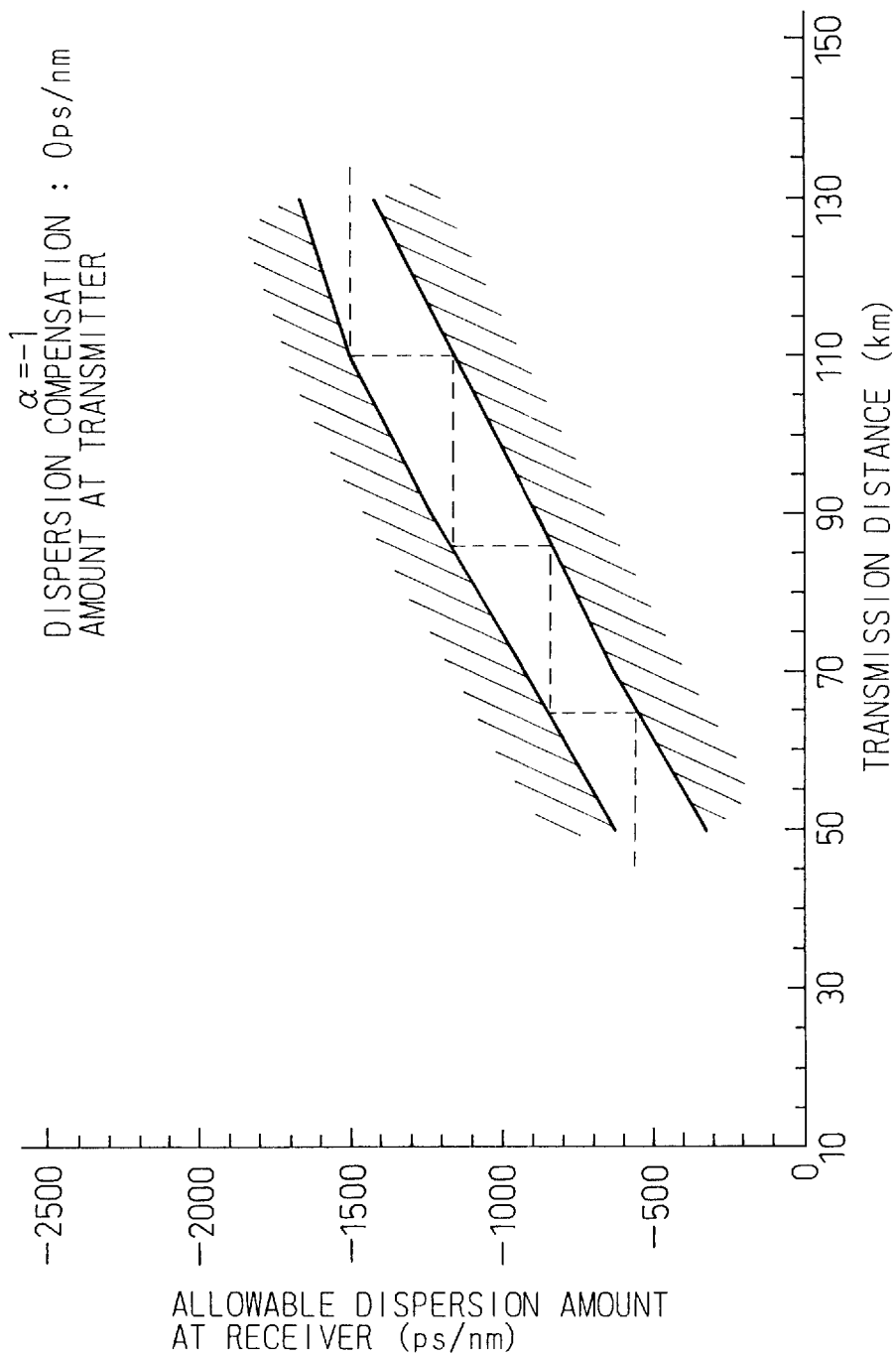
FIG. 2 is a graph showing the range of an allowable dispersion amount in the system of FIG. 1.
Figure 4:
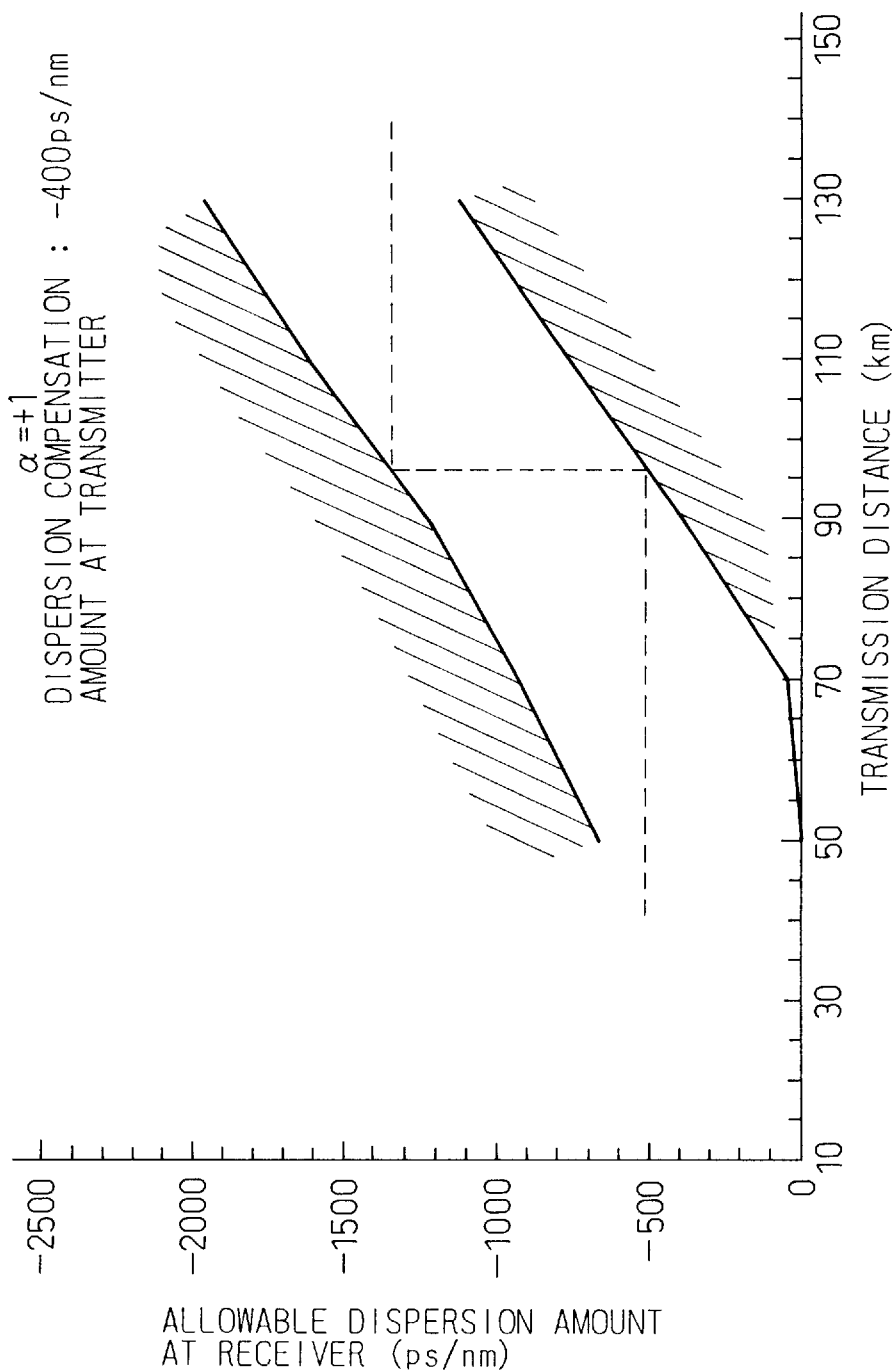
FIG. 4 is a graph showing the range of an allowable dispersion amount in the system of FIG. 3.

FIG. 2 is a diagram showing the range of the dispersion compensation amount, at the receiving end, that can satisfy desired transmission characteristics (amplitude attenuation of 1 dB or less, phase margin of 70% or larger) for various transmission distances. FIG. 2 and FIG. 4, described later, both show the results of a computer simulation conducted considering the SPM effect of the fiber. It is shown in FIG. 2 that, to cover transmission distances from 50 km to 130 km, four types of dispersion compensators are necessary as indicated by dotted lines.

Figure 3:
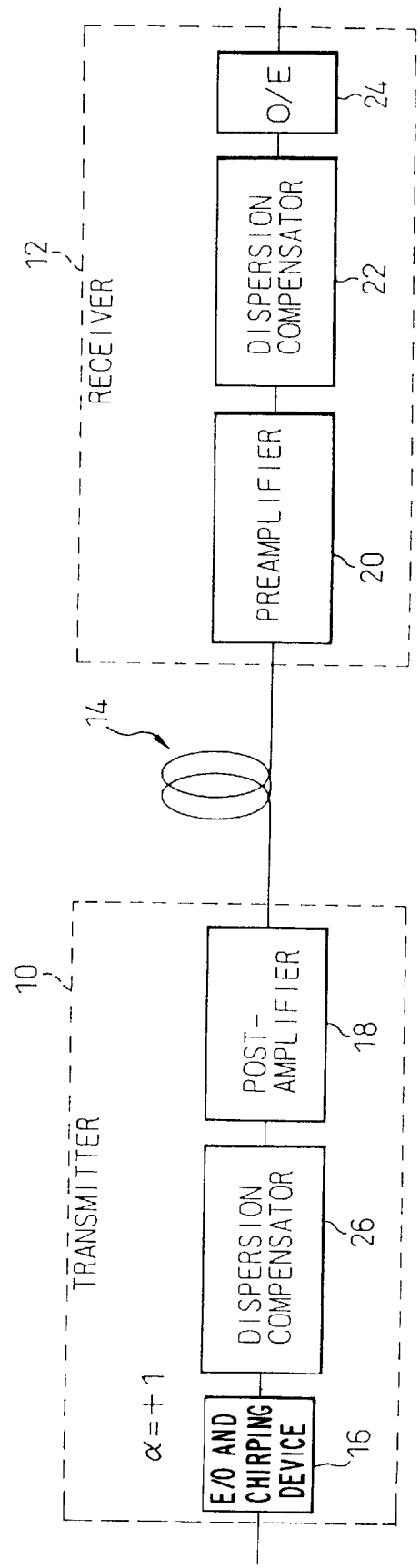
FIG. 3 is a block diagram of an optical transmission system according to the present invention.

FIG. 3 is a block diagram of an optical transmission system according to the present invention. In the present invention, though the dispersion value of the SMF 14 is positive as in the case of FIG. 1, the chirping parameter α is set to a positive value, preferably a positive value not larger than 2, and more preferably +1. The required dispersion compensation amount is therefore larger than in the case of FIG. 1. If the compensation amount of the dispersion compensator 22 is increased, the loss also increases, and the optical input power to the optical detector 24 decreases, resulting in receiver sensitivity degradation. If the gain of the preamplifier 20 is raised to increase the input optical power to the dispersion compensator 22 and hence the input power to the optical detector 24, waveform degradation occurs due to the SPM in the dispersion compensator 22. In the optical transmission system shown in FIG. 3, this problem has been overcome since a dispersion compensator 26 is provided at the front end of the post-amplifier 18 at the transmitting end. In this case, it is desirable that the dispersion compensation amount of the dispersion compensator 26 at the transmitting end be fixed, and that the dispersion compensation amount of dispersion compensator 22 be selected to match the length of the SMF 14.

FIG. 4 is a diagram showing the range of the dispersion compensation amount, at the receiving end, that can satisfy the desired transmission characteristics for various transmission distances when the chirping parameter α of the transmitter is set to +1 and a dispersion compensator having a dispersion amount of −400 ps/nm is used at the transmitting end. As can be seen from the figure, by setting the chirping parameter α at the transmitting end to +1, the effect of the SPM in the fiber is alleviated, and the transmission characteristics are improved as a whole, thus expanding the range of the allowable dispersion compensation amount.

Accordingly, a wide range of transmission distances can be covered by only two types of dispersion compensators, as shown by dotted lines in the figure. Furthermore, it is possible to omit the dispersion compensator 22 at the receiving end for transmission distances shorter than 50 km.

The dispersion compensators 22 and 26 used here can be constructed from a dispersion-compensating fiber (DCF), a fiber grating-type dispersion equalizer, a waveguide-type dispersion equalizer, a resonator-type dispersion equalizer, etc. a DCF is constructed with a smaller core diameter and a larger core-clad refractive index difference than a SMF, thereby shifting the zero dispersion wavelength to a longer wavelength to obtain negative dispersion at the signal light wavelength band (1.5 μm band).

Figure 5:
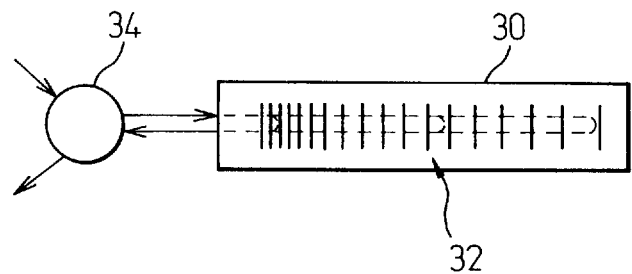
FIG. 5 is a diagram showing the principle of a fiber grating-type dispersion equalizer.

FIG. 5 is a diagram showing the principle of a fiber grating-type dispersion equalizer. A grating 32 (producing periodic changes in refractive index) having progressively changing grating interval is provided inside a fiber 30. When light enters the fiber, the light is reflected back from different positions depending on different wavelengths contained in the light. That is, different wavelengths of light are reflected back with different delay times; the reflected light is then extracted by a circulator 34 for dispersion equalization. A dispersion characteristic of opposite sign can be obtained by reversing the direction of the input to the fiber grating.

Figure 6:
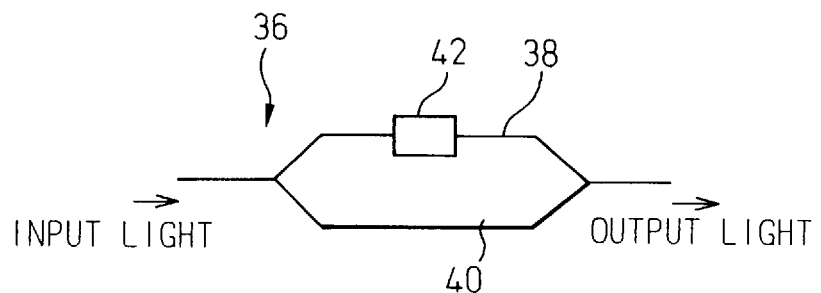
FIG. 6 is a diagram showing the principle of a waveguide-type dispersion equalizer.

FIG. 6 is a diagram showing the principle of a waveguide-type dispersion equalizer. A waveguide 36 is formed from silica ($SiO_2$), for example, on an Si substrate, and a phase shifter 42 is used to provide a phase difference between an upper waveguide 38 and a lower waveguide 40. An input optical signal is adjusted in phase by the phase shifter 42 so that the longer wavelength components mainly propagate, for example, through the lower waveguide and the shorter wavelength components propagate through the upper waveguide. By propagating through a plurality of such waveguide pairs, a negative dispersion characteristic can be obtained. By phase adjustment, a dispersion characteristic of opposite sign can be obtained. A thin-film heater is used as the phase shifter 42.

Figure 7:
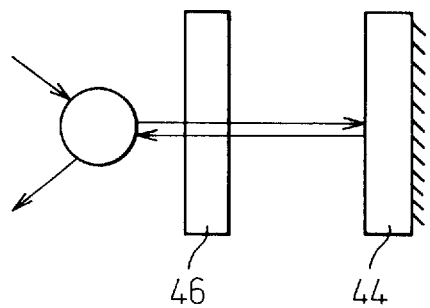
FIG. 7 is a diagram showing the principle of a resonator-type dispersion equalizer.

FIG. 7 is a diagram showing the principle of a resonator-type dispersion equalizer. A fully reflective mirror 44 and a semi-transparent mirror 46 are placed opposite each other; when light enters from the side of the semi-transparent mirror 46, only light of a wavelength that corresponds to the mirror spacing undergoes multiple reflection between the mirrors, and resonance thus occurs. Near the resonant wavelength, light that underwent reflection a certain number of times proportional to its frequency is reflected back. By extracting the reflected light by a circulator, different delay times are given to the light of different wavelengths, thus achieving dispersion equalization. A dispersion characteristic of opposite sense can be obtained depending on whether a region higher or lower than the resonant frequency is used.

Figure 8:
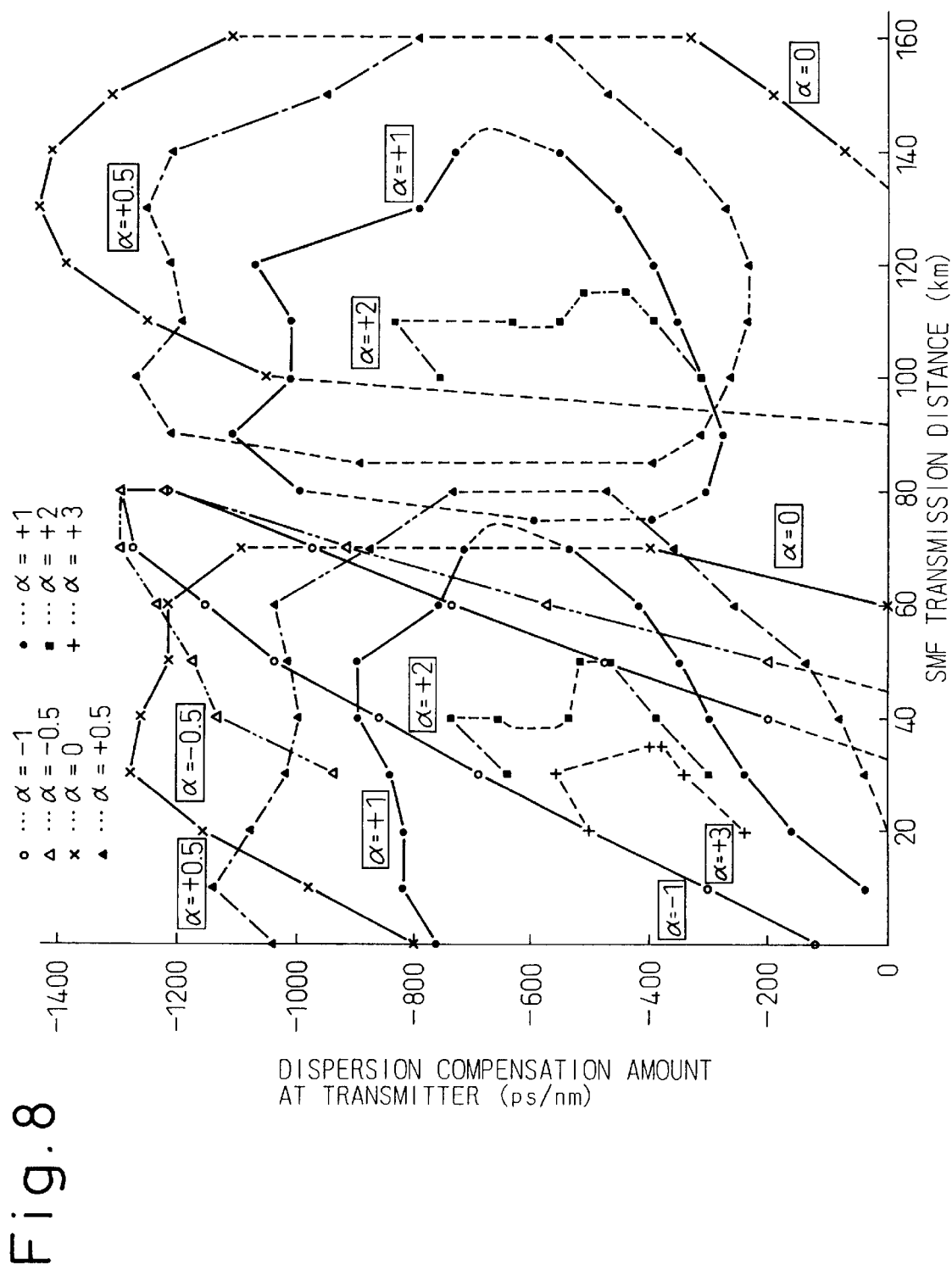
FIG. 8 is a diagram showing graphs of attainable transmission distance versus transmitter dispersion compensation amount when transmitter power is +14 dBm.

A description will now be given of how the value of the chirping parameter $\alpha$ is set in the optical transmission system of the present invention. FIG. 8 shows graphs plotting the attainable transmission distance versus the transmitter dispersion compensation amount when transmitter power=+14 dBm. The left half shows graphs when no dispersion compensation is applied at the receiving end, and the right half shows graphs when dispersion compensation of −1200 ps/nm is applied at the receiving end. The right half shows directly the tolerances of dispersion compensation under the condition of the receiver dispersion compensation of −1200 ps/nm, and by obtaining the value of the parameter $\alpha$ that maximizes the tolerance, an optimum value of the parameter $\alpha$ is determined. It is believed, however, that the optimum setting of the parameter $\alpha$ can be obtained in more a general form from the graphs in the left half part. The reason will be explained below.

In general, the generation of the nonlinear effects more or less calms down by the time the light travels 50 km or so, though this depends on the fiber attenuation (at distances longer than 50 km, the nonlinear effects scarcely occur because of reduced optical power in the fiber, though the influence of the nonlinear effects already generated does not vanish). Consequently, at distances longer than 50 km, the light spectrum no longer varies, and the nonlinear effects generated at that distance becomes negligible small. In other words, for the dispersion amount given by the transmission channel at distances longer than 50 km, if dispersion compensation is applied at the receiving end using a dispersion amount equal in absolute value but opposite in sign to the above dispersion amount, the waveform at the 50 km point can be restored. At this time, if the waveform at the 50 km point is good, it can be said that reception is possible.

On the other hand, the transmission characteristics with no dispersion compensation at the receiver, indicate that the compensation tolerance when the receiver dispersion compensation is applied becomes more relaxed as the attainable transmission distance is extended further beyond 50 km. This means that, in the graphs in the left half of FIG. 8, graphs having wider and longer tolerance regions provide wider compensation tolerances when performing dispersion compensation at the receiving end in a longer-distance transmission system. In fact, the optimum value of the parameter $\alpha$ in the graphs in the left half is around +0.5, which coincides with the optimum value in the graphs in the right half part.

From the results of FIG. 8, it is expected that the parameter $\alpha$, when set at or near +0.5, gives the best result, but this value is applicable when the transmitter output is +14 dBm; it is considered that the optimum value of the parameter $\alpha$ will vary with transmitter output.

The transmitter output that can be obtained through an optical amplifier is assumed to be about +10 to +20 dBm at the present time, so that the output varies about −4 dB to +6 dB with respect to +14 dBm. Here, the amount of frequency shift of the light source is proportional to the parameter $\alpha$, and the amount of frequency shift due to the SPM of the transmission fiber depends on the transmitter output when the transmission distance is fixed. Therefore, when the two are in a complementary relationship, it is believed that the optimum value of the parameter $\alpha$ varies in proportion to the amount of change of the transmitter output. It is therefore predicted that the optimum value of the parameter $\alpha$ also varies about −4 dB to +6 dB with respect to +0.5, that is, within a range of $0.2 \leq \alpha \leq 2.0$.

From the above result, the upper limit value of the optimum parameter $\alpha$ is 2. For the lower limit value, 0 is appropriate when a case is also considered where the optical amplifier is not used and the transmitter output is low.

Accordingly, though the transmitter chirping parameter $\alpha$ is fixed to +1 in the system of FIG. 3, it is preferable that $\alpha$ be made variable and be adjusted within the range of $0<\alpha<2$. As is well known, when an MI external modulator or a Mach-Zehnder modulator is used as the optical modulator 16, the chirping parameter $\alpha$ can be varied by varying the driving voltage of the modulator. Thus, element 16 functions as an electrical-to-optical converter and a chirping means/device.

As described above, according to the present invention, by setting the transmitter chirping parameter to a positive value when the dispersion value of the transmission fiber is positive, the allowable range of the dispersion compensation amount can be expanded.

We claim:

1. An optical transmission system comprising:
   an optical fiber installed between a transmitting end and a receiving end, and having a positive dispersion value with respect to the wavelength of an optical signal to be transmitted from the transmitting end to the receiving end;
   a dispersion compensator connected in series with said optical fiber to at least one of the transmitting end and the receiving end, and having a negative dispersion value with respect to the wavelength of the optical signal to be transmitted; and
   a chirping device to apply a positive chirping to the optical signal at the transmitting end.

2. A system according to claim 1, wherein a chirping parameter $\alpha$ in said chirping device is not larger than 2.

3. A system according to claim 2, wherein said chirping parameter $\alpha$ is approximately 1.

4. A system according to claim 2, wherein said chirping parameter $\alpha$ is set in said chirping device according to the length of said optical fiber.

5. A system according to claim 1, wherein said dispersion compensator includes a transmitter dispersion compensator connected fixedly at the transmitting end, and a receiver dispersion compensator connected at the receiving end, said receiver dispersion compensator being selected from among a plurality of dispersion compensators having different dispersion values according to the length of said optical fiber.

6. A system according to claim 1, wherein said dispersion compensator is a dispersion-compensated fiber.

7. A system according to claim 1, wherein said dispersion compensator is a fiber grating-type dispersion equalizer.

8. A system according to claim 1, wherein said dispersion compensator is a waveguide-type dispersion equalizer.

9. A system according to claim 1, wherein said dispersion compensator is a resonator-type dispersion equalizer.

10. A system according to claim 1, wherein the dispersion compensator is provided at the transmitting end.

11. A system according to claim 1, wherein a pulse width of the optical signal is broadened after transmission through the optical fiber.

12. An optical transmission system comprising:

an optical fiber installed between a transmitting end and a receiving end, and having a positive dispersion value with respect to the wavelength of an optical signal to be transmitted from the transmitting end to the receiving end; and a chirping device to apply a positive chirping to the optical signal at the transmitting end such that after transmission through the optical fiber, dispersion influence given to the optical signal is compensated.

13. A system according to claim 12, wherein a chirping parameter $\alpha$ in said chirping device is not larger than 2.

14. A system according to claim 13, wherein said chirping parameter $\alpha$ is approximately 1.

15. A system according to claim 12, wherein a pulse width of the optical signal is broadened after transmission through the optical fiber.

16. An optical transmission system comprising:

an optical fiber installed between a transmitting end and a receiving end, and having a positive dispersion value with respect to the wavelength of an optical signal to be transmitted from the transmitting end to the receiving end; and chirping means for applying a positive chirping to the optical signal at the transmitting end such that after transmission through the optical fiber, dispersion influence given to the optical signal is compensated.

17. A system according to claim 16, wherein a chirping parameter $\alpha$ in said chirping means is not larger than 2.

18. A system according to claim 16, wherein said chirping parameter $\alpha$ is approximately 1.

19. A system according to claim 16, wherein a pulse width of the optical signal is broadened after transmission through the optical fiber.

20. An optical transmitter device for use with an optical fiber, comprising:

an external modulator to modulate light from a light source to thereby produce an optical signal having a wavelength, the optical fiber having a positive dispersion value with respect to the wavelength of the optical signal; and a chirping device to apply a positive chirping to the optical signal.

21. A transmitter according to claim 20, further comprising a dispersion compensator connected downstream from the external modulator and the chirping device, the dispersion compensator having a negative dispersion value with respect to the wavelength of the optical signal produced by the external modulator.

22. A transmitter according to claim 21, wherein said dispersion compensator is a dispersion-compensated fiber.

23. A transmitter according to claim 20, wherein a chirping parameter $\alpha$ in said chirping device is not larger than 2.

24. A transmitter according to claim 23, wherein said chirping parameter $\alpha$ is approximately 1.

25. A transmitter according to claim 20, wherein a pulse width of the optical signal produced by the external modulator is broadened after transmission through the optical fiber.

26. A method of producing an optical signal, comprising the steps of:

transmitting the optical signal over an optical fiber having a positive dispersion value with respect to a wavelength of the optical signal; and applying a positive chirping to the optical signal such that after transmission through the optical fiber, dispersion influence given to the optical signal is compensated.

27. A method according to claim 26, wherein the positive chirping is applied to the optical signal in accordance with a chirping parameter $\alpha$, the chirping parameter $\alpha$ being selected based on the length said optical fiber.

28. A method according to claim 26, wherein an external modulator is used to generate the optical signal, the chirping is applied to the optical signal based on a chirping parameter $\alpha$, and the chirping parameter $\alpha$ is varied by varying a driving voltage applied to the external modulator.

29. A method according to claim 26, wherein the positive chirping is applied to the optical signal in accordance with a chirping parameter $\alpha$, the chirping parameter $\alpha$ being not larger than 2.

30. A method according to claim 29, wherein said chirping parameter $\alpha$ is approximately 1.

31. A method according to claim 26, wherein a pulse width of the optical signal is broadened after transmission through the optical fiber.

32. An optical transmission system, operatively coupled to an optical fiber having a first dispersion value with respect to a wavelength of an optical signal to be transmitted therethrough, comprising:

a dispersion compensator connected in series with said optical fiber, and having a second dispersion value with a sign opposite that of the first dispersion value with respect to the wavelength of the optical signal to be transmitted; and a chirping device to apply a chirping to the optical signal at a transmitting end of the optical fiber so that after transmission through the optical fiber, a pulse width of the optical signal is broadened.

33. A system according to claim 32, wherein a chirping parameter $\alpha$ in said chirping device is not larger than 2.

34. A system according to claim 33, wherein said chirping parameter $\alpha$ is approximately 1.

35. A system according to claim 33, wherein said chirping parameter $\alpha$ is set in said chirping device according to the length of said optical fiber.

36. A system according to claim 32, wherein said dispersion compensator includes a transmitter dispersion compensator connected fixedly at the transmitting end of the optical fiber, and a receiver dispersion compensator connected at a receiving end of the optical fiber, said receiver dispersion compensator being selected from among a plurality of dispersion compensators having different dispersion values according to the length of said optical fiber.

37. A system according to claim 32, wherein said dispersion compensator is a dispersion-compensated fiber.

38. A system according to claim 32, wherein said dispersion compensator is a fiber grating-type dispersion equalizer.

39. A system according to claim 32, wherein said dispersion compensator is a waveguide-type dispersion equalizer.

40. A system according to claim 32, wherein said dispersion compensator is a resonator-type dispersion equalizer.

41. A system according to claim 32, wherein the dispersion compensator is provided at a transmitting of the optical fiber.

42. An optical transmission system comprising:

an optical fiber installed between a transmitting end and a receiving end, and having a dispersion value with respect to the wavelength of an optical signal to be transmitted from the transmitting end to the receiving end; and a chirping device to apply a chirping to the optical signal at the transmitting end so that after transmission through the optical fiber, a pulse width of the optical signal is broadened and dispersion influence given to the optical signal is compensated.

43. An optical transmission system, operatively coupled to an optical fiber having a dispersion value with respect to a wavelength of an optical signal to be transmitted therethrough, comprising:

chirping means for applying a chirping to the optical signal at a transmitting end of the optical fiber so that after transmission through the optical fiber, a pulse width of the optical signal is broadened and dispersion influence given to the optical signal is compensated.

44. A system according to claim 43, wherein a chirping parameter α in said chirping means is not larger than 2.

45. A system according to claim 43, wherein said chirping parameter α is approximately 1.

46. An optical transmitter device for use with an optical fiber, comprising:

an external modulator to modulate light from a light source to thereby produce an optical signal having a wavelength, the optical fiber having a dispersion value with respect to the wavelength of the optical signal; and a chirping device to apply a chirping to the optical signal so that after transmission through the optical fiber, a pulse width of the optical signal is broadened.

47. A transmitter according to claim 46, further comprising a dispersion compensator connected downstream from the external modulator and the chirping device, the dispersion compensator having a negative dispersion value with respect to the wavelenght of the optical signal produced by the external modulator.

48. A transmitter according to claim 47, wherein said dispersion compensator is a dispersion-compensated fiber.

49. A method of producing an optical signal, comprising the steps of:

transmitting the optical signal over an optical fiber having a dispersion value with respect to a wavelength of the optical signal; and applying a chirping to the optical signal so that after transmission through the optical fiber, a pulse width of the optical signal is broadened and dispersion influence given to the optical signal is compensated.

50. A method according to claim 49, wherein the chirping is applied to the optical signal in accordance with a chirping parameter α, the chirping parameter α being selected based on the length said optical fiber.

51. A method according to claim 49, wherein an external modulator is used to generate the optical signal, the chirping is applied to the optical signal based on a chirping parameter α, and the chirping parameter α is varied by varying a driving voltage applied to the external modulator.

52. A dispersion compensator operatively coupled to an optical fiber having a first dispersion value with respect to a wavelength of an optical signal to be transmitted therethrough, comprising:

a dispersion compensating fiber having a second dispersion value with a sign opposite to that of the first dispersion value with respect to the wavelength of the optical signal to be transmitted, wherein a chirping is applied to the optical signal at a transmitting end of the optical fiber so that after transmission through the optical fiber, a pulse width of the optical signal is broadened.

53. A dispersion compensator according to claim 52, wherein the chirping is applied based on a chirping parameter α that is not larger than 2.

54. A dispersion compensator according to claim 53, wherein said chirping parameter α is approximately 1.

55. A dispersion compensator according to claim 53, wherein said chirping parameter α is set according to the length of said optical fiber.

56. A dispersion compensator according to claim 52, wherein said dispersion compensating fiber includes a transmitter dispersion compensating fiber connected fixedly at the transmitting end of the optical fiber, and a receiver dispersion compensating fiber connected at a receiving end of the optical fiber, said receiver dispersion compensating fiber being selected from among a plurality of dispersion compensating fibers having different dispersion values according to the length of said optical fiber.

57. A dispersion compensator according to claim 52, wherein the dispersion compensating fiber is provided at the transmitting end of the optical fiber.

58. A method of transmitting an optical signal through an optical fiber having a first dispersion value with respect to a wavelength of the optical signal, comprising the steps of:

applying a chirping to the optical signal at a transmitting end of the optical fiber so that after transmission through the optical fiber, a pulse width of the optical signal is broadened; and compensating for dispersion in the optical signal with a dispersion compensating fiber having a second dispersion value with a sign opposite to that of the first dispersion value.

59. A method according to claim 58, wherein the chirping is applied to the optical signal in accordance with a chirping parameter α, the chirping parameter α being selected based on the length said optical fiber.

60. A method according to claim 58, wherein an external modulator is used to generate the optical signal, the chirping is applied to the optical signal based on the chirping parameter α, and the chirping parameter α is varied by varying a driving voltage applied to the external modulator.

61. A method according to claim 58, wherein the chirping is applied to the optical signal in accordance with a chirping parameter α, the chirping parameter α being not larger than 2.

62. A method according to claim 61, wherein said chirping parameter α is approximately 1.

* * * * *